July 10, 1962
E. P. AGHNIDES
3,043,391
STEERING MEANS FOR TANDEM WHEEL VEHICLE
HAVING TILTED AXLES
Filed May 19, 1961
2 Sheets-Sheet 2
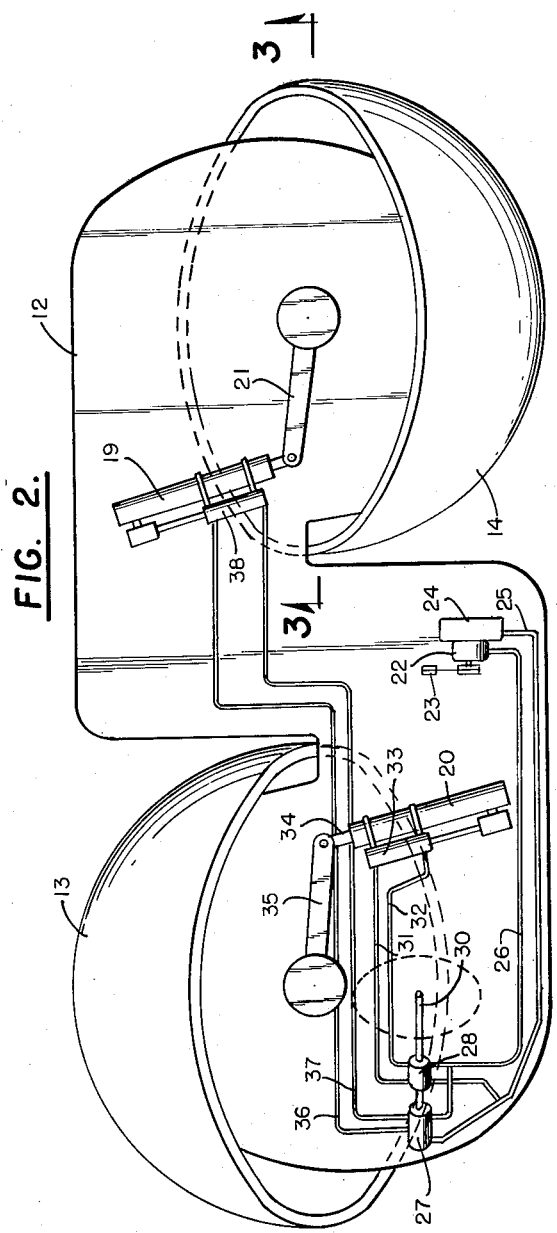
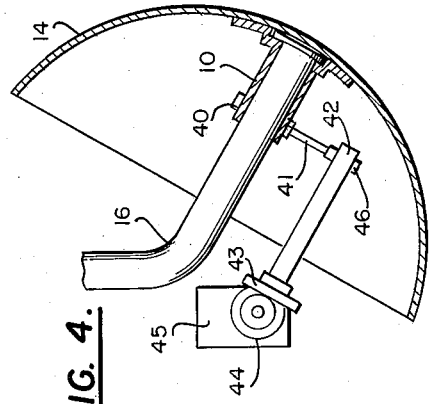
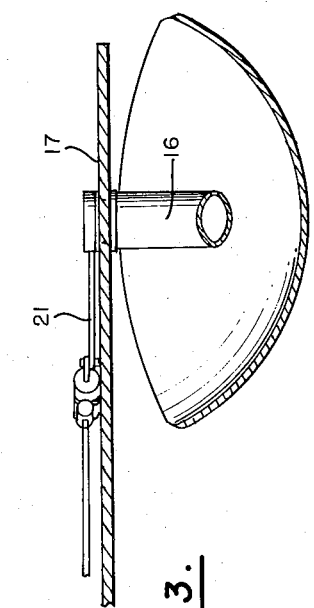
INVENTOR
Elie P. Aghnides
BY *Moore and Hall*
ATTORNEYS

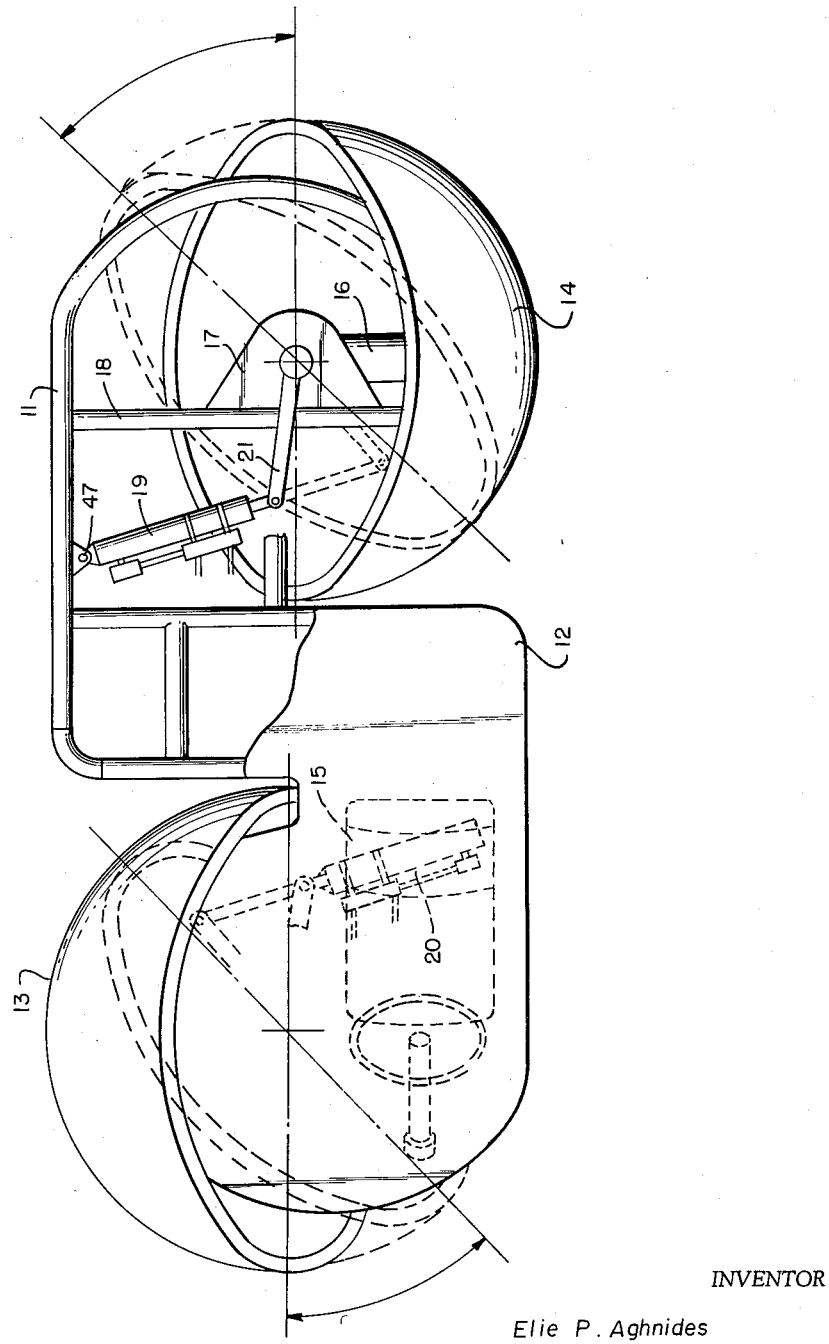

United States Patent Office 3,043,391
Patented July 10, 1962

3,043,391
STEERING MEANS FOR TANDEM WHEEL VEHICLE HAVING TILTED AXLES
Elie P. Aghnides, 46 W. 54th St., New York 19, N.Y.
Filed May 19, 1961, Ser. No. 111,377
12 Claims. (Cl. 180—79.2)

The present invention relates to vehicles having two wheels, and more particularly relates to means for steering such a vehicle.

In my U.S. Patent No. 2,967,581, entitled Tandem Wheel Vehicle Having Tilted Axles, granted January 1, 1961, I have disclosed and claimed a vehicle having two hemispheroidal wheels on opposite sides, one near the front end and the other near the rear, with the respective axles of the wheels pointed outwardly and downwardly so as to stabilize the body and with the two wheels acting as the entire support for the vehicle. The hemispheroidal wheels preferably have their near edges passing through indents in the body so that the edges of the wheels pass under the vehicle. It is also shown in this patent that the rear wheel preferably contacts the ground substantially directly to the rear of the place where the front wheel touches the ground.

It is an object of the present invention to provide a steering means for a two-wheeled vehicle where such wheels are in a tandem relationship.

It is another object of this invention to provide a steering means for a tandem two-wheeled vehicle having tilted axles such as is described in my prior Patent No. 2,967,581.

It is another object of this invention to provide a power steering system for a vehicle having two tandemly mounted wheels.

It is another object of this invention to provide a power steering system for a two-wheeled vehicle where the wheels are in tandem relationship and each is capable of being turned in only one direction from the normal, straight-ahead position.

Other objects, purposes, and characteristic features of this invention will in part be obvious from the accompanying drawings and will in part become clear as the description of the invention progresses.

In describing the invention, reference will be made to the accompanying drawings in which like reference characters are used throughout the several views to refer to like parts and in which:

FIG. 1 is a top view of the vehicle of the present invention;

FIG. 2 particularly illustrates the organization of the power steering system of the present invention as applied to a vehicle of the type shown in FIG. 1;

FIG. 3 is a cross-sectional view of a portion of the vehicle of FIG. 2 taken along the lines 3—3 of FIG. 2; and FIG. 4 is a cross-sectional view of one of the wheels.

The vehicle is shown in FIG. 1 as comprising a tubular frame 11 carrying a body portion 12 which has in part been cut away to show the structure more clearly. The frame 11 has what may be referred to as an S-shape and mounts hemispheroidal wrap-around front and rear wheels 13 and 14, respectively, which are angularly mounted as shown by the fact that the bottom portion of each wheel is considerably inward of the upper portion. The vehicle includes means for driving one or both of the wheels from an engine which may be affixed to the frame 11 and drives the wheels through a gear or chain drive mechanism as shown diagrammatically in FIG. 4. A single seat 15 is provided for the use of the driver of the vehicle, but it is to be understood that other seats may be provided as desired.

As is disclosed in my previously-mentioned U.S. Patent No. 2,967,581, it may ordinarily be desirable to provide one or more tires for each of the hemispheroidal wheels, but these have also not been shown in the drawings of this application since the use of such tires is immaterial to an understanding of the mode of operation of this invention.

Each of the hemispheroidal wheels has a bearing means and mounting rigidly affixed thereto (see FIG. 4) such as the means 10 associated with wheel 14. This means 10 is centrally located with respect to wheel 14 but disposed at an angle to the horizontal and is mounted for rotation on shaft 16 carried by the chassis of the vehicle. The bearing means 10 is affixed to an encircling sprocket 40 driven by a chain or the like 41 which, in turn, is driven by shaft 42 through sprocket 46. Shaft 42 is connected by suitable gearing 43 and 44 to an engine 45 mounted within the body of the vehicle. Similar structure may, of course, be provided for the other wheel 13.

Shaft or trunnion 16 is shown in FIG. 4 as being bent upwardly. The shaft 16 may be journaled within the plate 17 which is affixed to tubular member 18 of the chassis and may even extend through the upper plate 12 as disclosed in FIG. 2. An operating arm 21 is secured to the shaft or trunnion 16 so that the application of a turning moment to the end arm 21 causes a rotational force to be exerted on the shaft 19 which results in a turning of the hemispheroidal wheel 14.

The front hemispheroidal wheel may be mounted in the same manner as just described for the rear wheel 14. Turning of each wheel is controlled by a hydraulic cylinder such as the cylinder 19 associated with wheel 14. The cylinder may be secured to the chassis or frame as by a bolt 47 (see FIG. 1); whereas, the piston may be fastened to the end of operating arm 21 in a similar manner. Thus, the application of fluid pressure to the cylinder 19 in a manner to be subsequently described so that its piston is caused to move outwardly causes a counter-clockwise turning of wheel 14 (as viewed from above) from the normal, straight-ahead position in which the wheel is shown in FIG. 1. When the piston is substantially fully extended, wheel 14 may be turned to the position shown by the dotted lines. A similar hydraulic cylinder 20 provides for turning of wheel 13 in a counter-clockwise direction.

When each hemispheroidal wheel is in the position shown by the solid lines of FIG. 1, the vehicle moves in a straight line. When it is desired to turn the vehicle to the left, then fluid pressure is applied to the cylinder 20 so as to extend the piston of this cylinder and thereby cause counter-clockwise rotation of wheel 13. On the other hand, when it is desired to turn the vehicle to the right, fluid pressure is applied to cylinder 19, thereby resulting in a counter-clockwise turning of wheel 14. Both the wheels and their respective operating cylinders are so arranged that neither wheel can turn in a clockwise direction from the solid line position shown for each wheel. The manner in which this control of the turning of the wheels is effected will now be described.

FIGURE 2 shows in greater detail the arrangement for controlling operation of the cylinders 19 and 20. The fluid pump is illustrated at 22. This pump has its shaft driven from pulley 23 which, in turn, may receive its power directly from the engine which is provided for propelling the vehicle. Associated with pump 22 is a reservoir 24 to which fluid is returned over return pipe 25. Fluid under pressure provided by the pump 22 is applied over the supply pipe 26 to both the valves 27 and 28.

When the steering column 30 is rotated in a counter-clockwise direction for the purpose of turning the vehicle to the left, the valve 28 is so operated that a pressure differential acts upon the slave cylinder 33 in such a manner that the power cylinder 20 is caused to extend its piston 34 and thereby rotate the steering arm 35 so as to turn wheel 13 in a counter-clockwise direction. Such turning of the steering column in a counter-clockwise direction from its neutral position has no effect upon the pressure applied to the supply lines 36 and 37 which are controlled by the other valve 27. Thus, there is no effect upon the slave cylinder 38 associated with the rear wheel 14 so that this wheel 14 remains in the position shown. Consequently, there is a turning of wheel 13 in response to a counter-clockwise turning of the steering column from the neutral position, but there is no turning of the rear wheel 14.

When the vehicle is to be turned to the right, the steering wheel rotates the steering column 30 in a clockwise direction from the neutral position and this produces a pressure differential in the supply lines 36 and 37 controlled by valve 27. Such pressure differential acts upon the slave cylinder 38 in such a manner that the fluid pressure becomes effective to drive the piston of power cylinder 19 outwardly. This causes the rear wheel 14 to be turned in a counter-clockwise direction so that the vehicle turns to the right. At such time, piston 34 provided for wheel 13 remains retracted so that wheel 13 remains in the normal position shown.

When the vehicle is in a right-hand turn, any turning of the steering column in a direction to restore it towards a neutral position can at first only result in a restoration of the rear wheel 14 towards its neutral, straight-ahead position. It is only when the steering column is turned beyond its neutral position to a left-hand turning position that the valve 28 is acted upon to produce a pressure differential in supply lines 31 and 32 which will act upon slave cylinder 33 and thereby cause the power cylinder 20 to be operated so as to result in a turning movement of the front wheel 13.

Both front and rear wheels are positively controlled at all times by the hydraulic pressure which acts upon the associated slave and power cylinders. Outside influences such as bumps in the roadway cannot affect the steering of the vehicle since each wheel will hold its position rigidly regardless of outside influences.

Having described a means for steering a tandem-wheeled vehicle having two hemispheroidal wheels, I desire it to be understood that various modifications, adaptations, and alterations may be made to the specific form of the invention illustrated without in any manner departing from the spirit or scope of this invention.

What I claim is:

1. In a vehicle having tandemly positioned hemispheroidal wheels on opposite sides with one near the front and the other near the rear, each said wheel having its axis pointed outwardly and downwardly and with the lower portion of said wheel being located under the body, each said wheel generally decreasing in diameter as the distance from the body increases, steering means for said vehicle including a steering control member operable in either of two generally opposite directions from a neutral position for turning said vehicle to the right and left respectively, means governed by said steering control member when operated in one of said directions from neutral to turn said front wheel in a particular direction from the straight-ahead position to thereby turn said vehicle in said particular direction and being governed by said steering control means when operated in the opposite of said directions from neutral to turn said rear wheel in said particular direction to thereby turn said vehicle in the opposite direction.

2. The said vehicle as defined in claim 1 wherein each said wheel can be turned in only one direction from its straight-ahead position.

3. The vehicle of claim 2 wherein said wheel turning means comprises for each wheel a hydraulic cylinder which is selectively actuated upon operation of said steering control member in a respective direction from normal to turn the associated wheel in said particular direction from its straight-ahead position.

4. A steering system for a vehicle having at least one front and one rear wheel comprising in combination, a steering control member being operable in either direction from a neutral position, wheel turning means for each wheel controlled by said steering control member for turning said wheel in a particular direction from a straight-ahead position in which said vehicle travels without turning but preventing the turning of each said wheel in the opposite direction, said wheel turning means being controlled by operation of said steering control member in one direction from neutral to turn said front wheel in said particular direction to thereby turn said vehicle in said particular direction, said wheel turning means being controlled by operation of said steering control member in the opposite direction from neutral to turn said rear wheel in said particular direction to thereby turn said vehicle in the opposite direction.

5. The steering system of claim 4 wherein said vehicle has a single hemispheroidal wheel at both the front and rear and with said wheels having their respective axles directed outwardly and downwardly from opposite sides of said vehicle, said wheel turning means comprising a fluid pressure responsive member for turning each wheel with each such fluid pressure responsive member being actuated in response to operation of said steering control member in a particular respective direction from its said neutral position.

6. The steering system of claim 5 wherein said steering control member comprises a steering wheel turning an associated steering column and said wheel turning means comprises at least one fluid control valve which supplies an operating fluid pressure to said fluid pressure responsive member for said front wheel when said steering column is turned in one direction from its neutral position to thereby turn said front wheel in said particular direction and supplies an operating fluid pressure to said fluid pressure responsive member for said rear wheel when said steering column is turned in the opposite direction from its neutral position to thereby turn said rear wheel in said particular direction.

7. The steering system of claim 5 wherein each said wheel has its axle rotatable within a substantially vertical trunnion, said trunnion being rotatable within a journal affixed to the frame of said vehicle, an arm fastened to and extending from the axis of said trunnion, said fluid pressure responsive means acting upon said arm to thereby rotate said trunnion so as to turn said wheel for steering said vehicle.

8. A steering system for a vehicle having at least one front wheel and also at least one rear wheel with each said wheel being turnable in only one direction from its normal straight-ahead position comprising, steering control means including a steering control member being operable in either of two directions from a neutral position, front wheel turning means governed by said steering control means for turning only said front wheel in said one direction when said steering control member is operated to one direction from its said neutral position, and rear wheel turning means also governed by said steering control means for turning only said rear wheel in said one direction when said steering control member is operated in the other direction from its said neutral position.

9. The steering control system of claim 8 wherein the said rear wheel turning means holds said rear wheel in its normal straight-ahead position whenever said steering control member is operated in said one direction from its said neutral position and said front wheel turning means holds said front wheel in its normal straight-ahead position whenever said steering control member is operated in said other direction from its said neutral position.

10. The steering control system of claim 9 in which said wheel turning means for each wheel includes at least one hydraulic cylinder, said steering control means including a source of fluid pressure and valve means governed by said steering control member for regulating the application of fluid pressure to said hydraulic cylinders selectively, said valve means being controlled by operation of said steering control member in said one direction from neutral to supply fluid pressure to said cylinder associated with said front wheel turning means to thereby turn said front wheel in said one direction, said valve means being controlled by operation of said steering control member in said other direction from neutral to supply fluid pressure to said cylinder associated with said rear wheel turning means to thereby turn said rear wheel in said one direction.

11. The steering control system of claim 9 in which said wheel turning means for each wheel includes a slave cylinder and a power cylinder, said steering control means including a source of fluid pressure and a valve means governed by said steering control member for regulating the application of fluid pressure to said slave cylinders selectively, said valve means being controlled by operation of said steering control member in said one direction from neutral to apply fluid pressure to said slave cylinder associated with said front wheel turning means, said valve means being controlled by operation of said steering control member in said other direction from neutral to supply fluid pressure to said slave cylinder associated with said rear wheel turning means, a power cylinder for each wheel governed by the associated slave cylinder for that wheel for turning said wheel, said power cylinder being controlled to turn the associated wheel in said one direction when the associated slave cylinder is operated in response to the application of fluid pressure thereto.

12. The steering control system of claim 10 in which said valve means includes a first hydraulic control valve and also a second hydraulic control valve both being selectively operated by said steering control means, said first control valve being operated in response to operation of said steering control member in one direction from neutral to cause fluid pressure to be applied to said hydraulic cylinder for said front wheel turning means, said second control valve being operated in response to the operation of said steering control member in the other direction from neutral to cause fluid pressure to be applied to said hydraulic cylinder for said rear wheel turning means.

References Cited in the file of this patent
UNITED STATES PATENTS

| | | |
|---|---|---|
| 2,598,863 | Tucker | June 3, 1952 |
| 2,783,849 | Armington et al. | Mar. 5, 1957 |
| 2,812,031 | Aghnides | Nov. 5, 1957 |
| 2,967,580 | Aghnides | Jan. 10, 1961 |
| 2,967,581 | Aghnides | Jan. 10, 1961 |

FOREIGN PATENTS

| | | |
|---|---|---|
| 822,338 | Great Britain | Oct. 21, 1959 |